United States Patent
Ayyaswamy et al.

(10) Patent No.: US 11,586,363 B2
(45) Date of Patent: Feb. 21, 2023

(54) SYSTEM AND METHOD OF CONFIGURING NON-VOLATILE MEMORY MEDIA

(71) Applicant: Dell Products L.P., Round Rock, TX (US)

(72) Inventors: Rajeswari Ayyaswamy, Round Rock, TX (US); Senthil Kumar Parangusam, Round Rock, TX (US); James Peter Giannoules, Round Rock, TX (US); Sheshadri Pathpalya Raghavendra Rao, Bengaluru (IN); Aniruddha Suresh Herekar, Belgaum (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/385,539

(22) Filed: Jul. 26, 2021

(65) Prior Publication Data
US 2023/0027000 A1    Jan. 26, 2023

(51) Int. Cl.
*G06F 3/06*    (2006.01)
*G06F 9/4401*    (2018.01)

(52) U.S. Cl.
CPC ............ *G06F 3/0629* (2013.01); *G06F 3/061* (2013.01); *G06F 3/0679* (2013.01); *G06F 9/4406* (2013.01)

(58) Field of Classification Search
CPC ...... G06F 3/0629; G06F 3/061; G06F 3/0679; G06F 9/4406
See application file for complete search history.

(56) References Cited

U.S. PATENT DOCUMENTS

| | | | | |
|---|---|---|---|---|
| 11,086,813 | B1* | 8/2021 | Schuette | G06F 13/4022 |
| 11,204,704 | B1* | 12/2021 | Jha | G06F 11/3051 |
| 2015/0050004 | A1* | 2/2015 | Swaminathan | H04N 21/854 |
| | | | | 386/241 |
| 2018/0246833 | A1* | 8/2018 | Bai | G06F 13/4282 |
| 2021/0157760 | A1* | 5/2021 | Kaler | G06F 13/423 |
| 2022/0237114 | A1* | 7/2022 | Kanno | G06F 12/0246 |

OTHER PUBLICATIONS

NVM Express Management Interface Revision 1.2, Jun. 2, 2021.

* cited by examiner

Primary Examiner — Edward J Dudek, Jr.
(74) Attorney, Agent, or Firm — McDermott Will & Emery LLP

(57) ABSTRACT

In one or more embodiments, one or more systems, one or more methods, and/or one or more processes may boot an operating system; after booting the operating system, determine that a solid state drive has been hot added to a Peripheral Component Interconnect Express (PCIe) port; suppress discovery of the solid state drive by the operating system; determine a policy associated with the solid state drive; determine that a current configuration associated with the solid state drive does not match a configuration associated with the policy associated with the solid state drive; determine that the configuration associated with the policy can be applied to the solid state drive; apply the configuration associated with the policy to the solid state drive without utilizing the operating system; and inform the operating system that the solid state drive has been communicatively coupled to at least one processor via a PCIe root complex.

20 Claims, 6 Drawing Sheets

SYSTEM AND METHOD OF CONFIGURING NON-VOLATILE MEMORY MEDIA

BACKGROUND

Field of the Disclosure

This disclosure relates generally to information handling systems and more particularly to configuring non-volatile memory media.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may boot an operating system on an information handling system; after booting the operating system, may determine that a solid state drive has been hot added to a Peripheral Component Interconnect Express (PCIe) port of the information handling system; may suppress discovery of the solid state drive by the operating system; may determine a policy associated with the solid state drive; may determine a current configuration associated with the solid state drive; may determine that the current configuration associated with the solid state drive does not match a configuration associated with the policy associated with the solid state drive; in response to determining that the current configuration does not match the configuration associated with the policy, may determine that the configuration associated with the policy can be applied to the solid state drive; may apply the configuration associated with the policy to the solid state drive without utilizing the operating system; and may inform the operating system that the solid state drive has been communicatively coupled to at least one processor of the information handling system via a PCIe root complex of the information handling system.

In one or more embodiments, determining the current configuration associated with the solid state drive may include communicating with the solid state drive via a bus. In one or more embodiments, the information handling system may include a baseboard management controller. For example, the baseboard management controller may determine the policy associated with the solid state drive. In one or more embodiments, the baseboard management controller may be communicatively coupled the PCIe root complex. For example, determining the current configuration associated with the solid state drive may include communicating with the solid state drive via the PCIe root complex. For instance, communicating with the solid state drive via the PCIe root complex may include communicating with the solid state drive via a vendor defined message (VDM) transport.

In one or more embodiments, the solid state drive may be communicatively coupled to the PCIe root complex via a PCIe link. For example, the one or more systems, the one or more methods, and/or the one or more processes may further, before suppressing discovery of the solid state drive by the operating system, bring up the PCIe link. In one or more embodiments, the one or more methods, and/or the one or more processes may further, before applying the configuration associated with the policy to the solid state drive, receive user input indicating approval to apply the configuration associated with the policy to the solid state drive. In one or more embodiments, the one or more methods, and/or the one or more processes may further, before the applying the configuration associated with the policy to the solid state drive: receive user input indicating a change to at least a portion of the configuration associated with the policy; and change the configuration associated with the policy based at least on the user input indicating the change to the at least the portion of the configuration associated with the policy.

In one or more embodiments, a baseboard management controller may receive first information that indicates that a solid state drive has been coupled to a PCIe port of an information handling system; may determine a policy associated with the solid state drive; may determine a current configuration associated with the solid state drive; may determine that the current configuration associated with the solid state drive does not match a configuration associated with the policy associated with the solid state drive; in response to determining that the current configuration does not match the configuration associated with the policy, may determine that the configuration associated with the policy can be applied to the solid state drive; may apply the configuration associated with the policy to the solid state drive without utilizing an operating system; and may provide, to information handling system firmware of the information handling system, second information indicating that the information handling system firmware can inform an operating system, executing on the information handling system, that the solid state drive has been communicatively coupled to at least one processor of the information handling system via a PCIe root complex of the information handling system.

In one or more embodiments, to determine the policy associated with the solid state drive, the baseboard management controller may further communicate with the solid state drive via a bus. In one or more embodiments, the baseboard management controller may be communicatively coupled the PCIe root complex. For example, to determine the current configuration associated with the solid state drive, the baseboard management controller may further communicate with the solid state drive via the PCIe root complex. For instance, to communicate with the solid state drive via the PCIe root complex, the baseboard management controller is further configured to communicate with the solid state drive via a VDM transport.

In one or more embodiments, the baseboard management controller may further, before applying the configuration associated with the policy to the solid state drive, receive user input indicating approval to apply the configuration associated with the policy to the solid state drive. In one or more embodiments, the baseboard management controller may further, before applying the configuration associated with the policy to the solid state drive: receive user input indicating a change to at least a portion of the configuration associated with the policy; and change the configuration associated with the policy based at least on the user input indicating the change to the at least the portion of the configuration associated with the policy.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
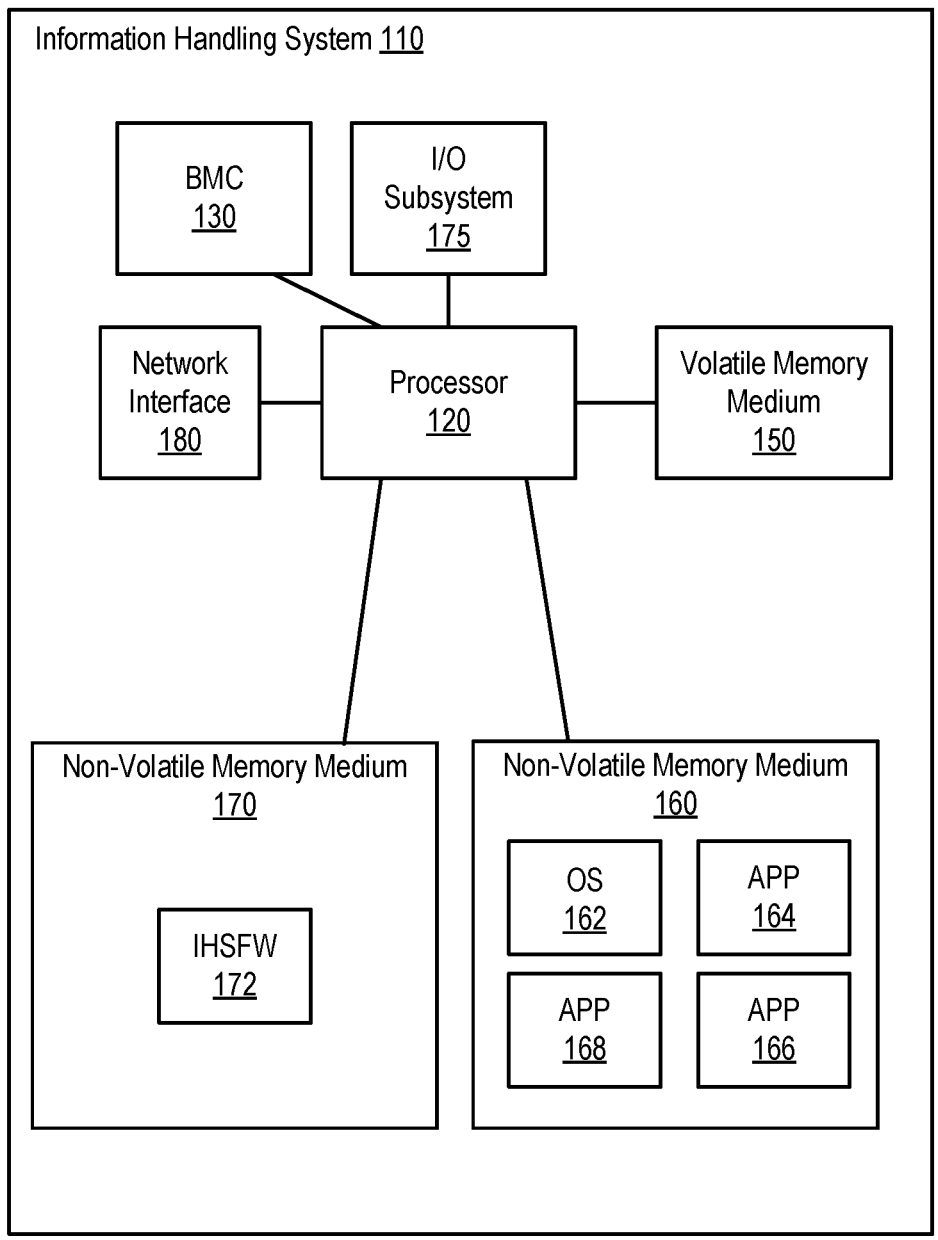
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a non-volatile memory express (NVMe) drive (e.g., a non-volatile storage device) may provide configurability such that the NVMe drive may be incompatible, or not optimally configured, for a specific information handling system and/or operating environment. For example, a user (e.g., an administrator) may need to ensure the operating environment does not consume the NVMe drive unless optimally configured and provide an application to modify a configuration of the NVMe drive. For instance, the configuration of the NVMe drive may include one or more of enumeration, size and formatting of namespaces, among others. In one or more embodiments, the NVMe drive may be configured with a desired or required configuration, or the NVMe drive may not be able to be configured with a desired or required configuration.

In one or more embodiments, one or more systems, one or more methods, and/or one or more processes may define, detect, report, and/or resolve initialization incompatibilities in NVMe drives that are communicatively coupled to a processor or a Peripheral Component Interconnect Express (PCIe) root port independent of an operating environment. In one or more embodiments, a baseboard management controller (BMC) of an information handling system may receive compatible property requirements of one or more NVMe drives. For example, the BMC may persist the compatible property requirements. For instance, the BMC may store the compatible property requirements.

In one or more embodiments, specified properties may be received from a user (e.g., an administrator). For example, the specified properties may be specific or broad. In one instance, a specified property may include that a NVMe drive include at least one namespace. In another instance, a specified property may include that a NVMe drive include only a single namespace with a namespace identification of "ID1". In one or more embodiments, the BMC may configure a NVMe drive with a specific configuration if a current configuration of the NVMe drive is not compatible with the specific configuration. For example, the BMC may configure a NVMe drive with a single full-sized 4096 byte logical sector size namespace if a current configuration of the NVMe drive is not compatible with the single full-sized 4096 byte logical sector size namespace.

In one or more embodiments, if a NVMe drive is configured with a specific configuration or after the NVMe drive is configured with the specific configuration, the NVMe drive may be presented to an operating system. In one example, a NVMe drive may be checked for configuration compatibility when an information handling system powers on and before presenting the NVMe drive to the operating system. In another example, a NVMe drive may be checked for configuration compatibility when the NVMe drive is hot-plugged into the information handling system and before presenting the NVMe drive to the operating system.

In one or more embodiments, the BMC may provide a user-configurable option to provide a controllable policy, which may define an acceptable NVMe drive. In one example, a NVMe drive may include a zero namespace or logical block address (LBA) size other than 512B/4 KB, which may be configured by a user (e.g., an administrator) via a controllable policy as an incompatibility. In another example, automatic configuration may be enabled, and the BMC may configure a NVMe drive with a new namespace. For instance, the BMC may modify a LBA size of the NVMe drive as the BMC configures the NVMe drive with the new namespace.

In one or more embodiments, the BMC may include a real time storage comprehensive embedded management (RTCEM) subsystem. For example, the RTCEM subsystem may utilize stored settings to determine one or more incompatibilities in a NVMe drive during runtime hot-plug. For instance, the BMC may utilize an interface of the NVMe drive to configure the NVMe drive. In one or more embodiments, the interface of the NVMe drive may include a serial interface. In one example, the serial interface of the NVMe drive may include an inter-integrated circuit ($I^2C$) bus interface. For instance, the serial interface of the NVMe drive may include a SMBus interface. As an example, the BMC may configure the NVMe drive via the serial interface. In one or more embodiments, the interface of the NVMe drive may include a PCIe interface. For example, the BMC may configure the NVMe drive via the PCIe interface. For instance, the BMC may configure the NVMe via PCIe vendor defined message (VDM) transport.

In one or more embodiments, when the BMC determines a configuration issue with a NVMe drive, the RTCEM subsystem may store information to a log. For example, the information stored to the log may include one or more of an enclosure identification and a drive slot number of the NVMe drive, among others. In one or more embodiments, the BMC may provide a user interface to a user (e.g., an administrator). For example, the user interface may indicate one or more non-configurable NVMe drives, a list of one or more NVMe drives that failed a NVMe controller configurability check, one or more of statuses of configurations associated with one or more NVMe drives, and an option to cease an ongoing configuration operation, among others.

In one or more embodiments, the list of one or more NVMe drives that failed the NVMe controller configurability check may include an enclosure identification, a slot identification, error information, a result of a determination if the error is recoverable, and a status of recovery/configuration that is in progress, among others. In one or more embodiments, when a NVMe drive configurability check failure is determined during a runtime hot-plug, the RTCEM subsystem may generate a log message. For example, the log message may include enclosure identification and slot number of the NVMe drive, among others.

In one or more embodiments, one or more interface of the BMC may obtain information from a data manager. For example, based at least on the information from the data manager, the BMC may report information associated with one or more NVMe drives, which may include an enclosure identification, a slot identification, an error code, a determination if a configuration is possible, and a progress of the configuration if the configuration is possible, among others.

In one or more embodiments, for each NVMe drive of one or more NVMe drives that are configurable, the BMC may automatically begin to configure the NVMe drive. For example, after the configuration operation has begun, the BMC may report a status associated with the configuration operation. In one or more embodiments, when new events are generated, the RTCEM subsystem may log the new events. For example, a new event may include an error. For instance, the RTCEM subsystem may log the error. In one or more embodiments, the BMC may provide an option to collect and export the log to technical support (e.g., one or more administrators, information handling systems associated with one or more administrators, etc.).

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an I²C bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 1B:
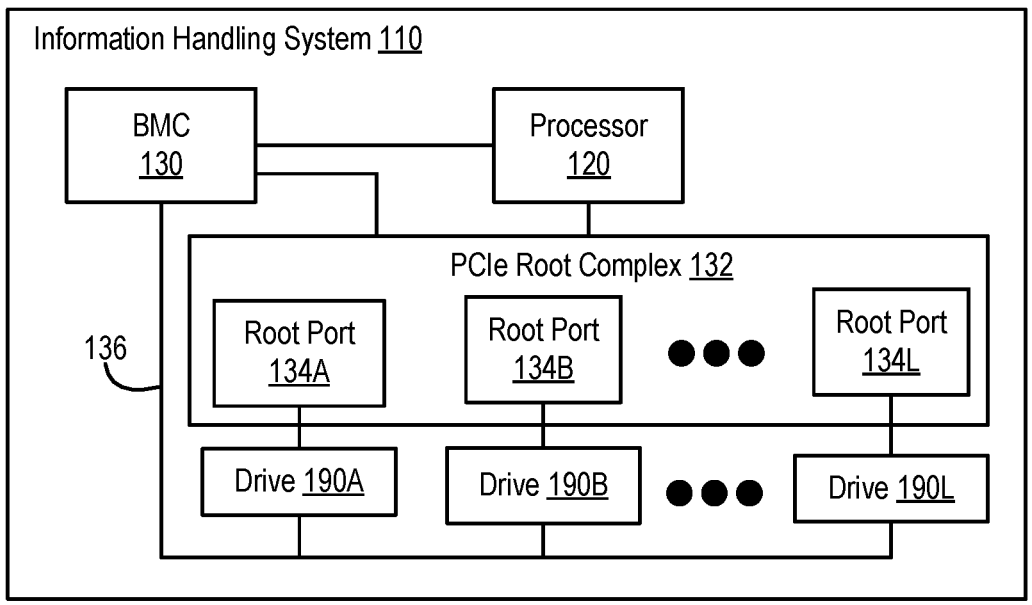
FIG. 1B illustrates a second example of an information handling system, according to one or more embodiments.

Turning now to FIG. 1B, a second example of an information handling system is illustrated, according to one or more embodiments. In one or more embodiments, IHS 110 may include a PCIe root complex 132. As shown, PCIe root complex 132 may be communicatively coupled to processor 120. In one or more embodiments, processor 120 may include PCIe root complex 132. In one or more embodiments, PCIe root complex 132 may include one or more root ports. As illustrated, PCIe root complex 132 may include root ports 134A-134L. Although PCIe root complex 132 is illustrated as including root ports 134A-134L, PCIe root complex 132 may include any number of root ports 134, according to one or more embodiments.

In one or more embodiments, IHS 110 may include one or more drives. As shown, IHS 110 may include drives 190A-190L. Although IHS 110 is illustrated as including drives 190A-190L, IHS 110 may include any number of drives 190, according to one or more embodiments. In one or more embodiments, drives 190A-190L may be respectively communicatively coupled to root ports 134A-134L. In one or more embodiments, a drive 190 may be or may include a solid state drive. For example, a drive 190 may include NAND flash memory. In one or more embodiments, a drive 190 may be compliant with a NVMe specification. For example, a drive 190 may be or may include a NVMe drive.

In one or more embodiments, IHS 110 may include a bus 136. For example, bus 136 may be or may include a serial bus. For instance, bus 136 may be or may include an I²C bus. As an example, bus 136 may be or may include a SMBus. In one or more embodiments, BMC 130 and drives 190A-190L may be communicatively coupled to bus 136. For example, BMC 130 may communicate with one or more of drives 190A-190L via sideband over bus 136. For instance, BMC 130 may communicate with one or more of drives 190A-190L via bus 136 utilizing a NVMe management interface (NVMe-MI). In one or more embodiments, BMC 130 communicating via sideband with a drive 190 may include BMC 130 communicating drive 190 without utilizing OS 162.

In one or more embodiments, BMC 130 may be communicatively coupled to PCIe root complex 132. For example, BMC 130 may communicate with one or more of drives 190A-190L via sideband over PCIe. For instance, BMC 130 may communicate with one or more of drives 190A-190L via PCIe root complex 132. In one or more embodiments, BMC 130 may communicate with one or more of drives 190A-190L via PCIe over VDM transport. For example, BMC 130 may communicate with one or more of drives 190A-190L via vendor defined messages over PCIe.

Figure 1C:
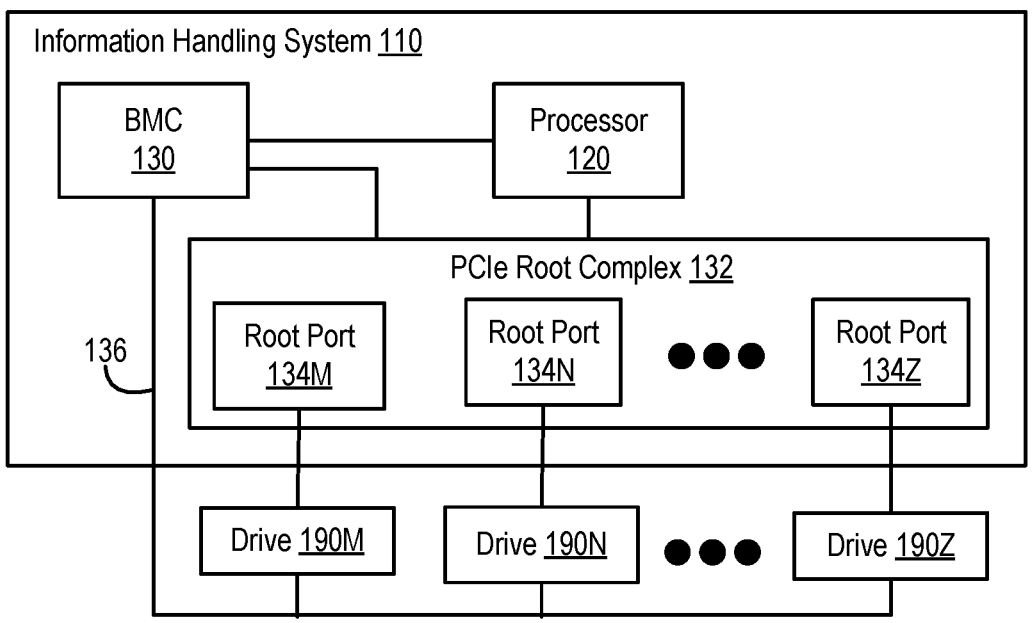
FIG. 1C illustrates a third example of an information handling system, according to one or more embodiments.

Turning now to FIG. 1C, a third example of an information handling system is illustrated, according to one or more embodiments. In one or more embodiments, IHS 110 may include PCIe root complex 132. As shown, PCIe root complex 132 may be communicatively coupled to processor 120. In one or more embodiments, processor 120 may include PCIe root complex 132. In one or more embodiments, PCIe root complex 132 may include one or more root ports. As illustrated, PCIe root complex 132 may include root ports 134M-134Z. Although PCIe root complex 132 is illustrated as including root ports 134M-134Z, PCIe root complex 132 may include any number of root ports 134, according to one or more embodiments.

In one or more embodiments, IHS 110 may be communicatively coupled to one or more drives. As shown, IHS 110 may be communicatively coupled to drives 190M-190Z. Although IHS 110 is illustrated as being communicatively coupled to drives 190M-190Z, IHS 110 may be communicatively coupled to any number of drives 190, according to one or more embodiments. In one or more embodiments, drives 190M-190Z may be respectively communicatively coupled to root ports 134M-134Z. In one or more embodiments, a drive 190 may be or may include a solid state drive. For example, a drive 190 may include NAND flash memory. In one or more embodiments, a drive 190 may be compliant with a NVMe specification. For example, a drive 190 may be or may include a NVMe drive.

In one or more embodiments, IHS 110 may include bus 136. For example, bus 136 may be or may include a serial bus. For instance, bus 136 may be or may include an I²C bus. As an example, bus 136 may be or may include a SMBus. In one or more embodiments, BMC 130 and drives 190M-190Z may be communicatively coupled to bus 136. For example, BMC 130 may communicate with one or more of drives 190M-190Z via sideband over bus 136. For instance, BMC 130 may communicate with one or more of drives 190M-190Z via bus 136 utilizing a NVMe-MI.

In one or more embodiments, BMC 130 may be communicatively coupled to PCIe root complex 132. For example, BMC 130 may communicate with one or more of drives 190M-190Z via sideband over PCIe. For instance, BMC 130 may communicate with one or more of drives 190M-190Z via PCIe root complex 132. In one or more embodiments, BMC 130 may communicate with one or more of drives 190M-190Z via PCIe over VDM transport. For example, BMC 130 may communicate with one or more of drives 190M-190Z via vendor defined messages over PCIe.

Figure 1D:
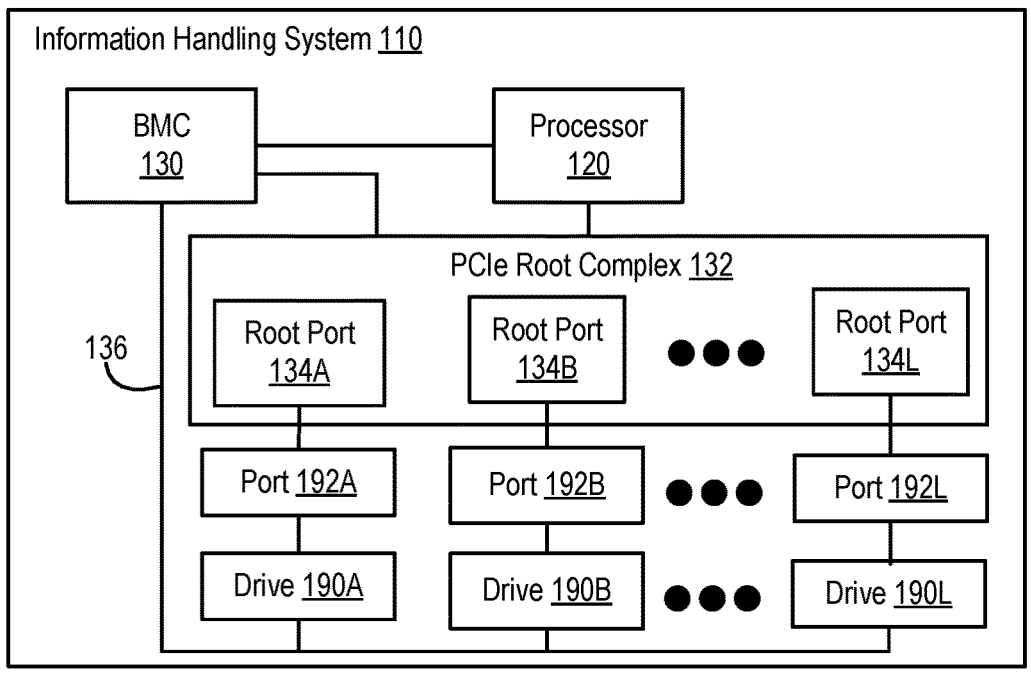
FIG. 1D illustrates a fourth example of an information handling system, according to one or more embodiments.

Turning now to FIG. 1D, a fourth example of an information handling system is illustrated, according to one or more embodiments. In one or more embodiments, an information handling system may include one or more physical PCIe ports. For example, IHS 110 may include physical PCIe ports 192A-192L. In one or more embodiments, a physical PCIe port 192 may provide a mechanical link between a drive 190 and IHS 110. For example, a physical PCIe port 192 may provide a mechanical link between a drive 190 and a PCIe root port 134. For instance, a physical PCIe port 192 may be communicatively coupled to a PCIe root port 134. As one example, a physical PCIe port 192 may include a PCIe slot (e.g., a x2 slot, a x4 slot, a x16 slot, etc.). As another example, a physical PCIe port 192 may include a M.2 connector.

Figure 1E:
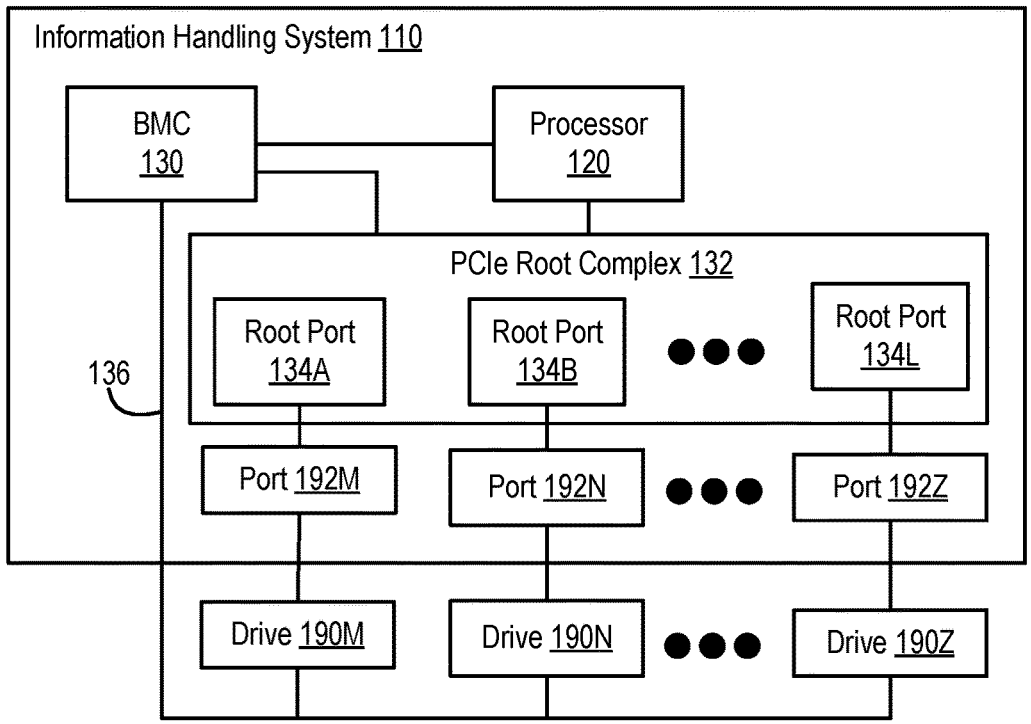
FIG. 1E illustrates another example of an information handling system, according to one or more embodiments.

Turning now to FIG. 1E, another example of an information handling system is illustrated, according to one or more embodiments. In one or more embodiments, an information handling system may include one or more physical PCIe ports. For example, IHS 110 may include physical PCIe ports 192M-192Z. In one or more embodiments, a physical PCIe port 192 may provide a mechanical link between a drive 190 and IHS 110. For example, a physical PCIe port 192 may provide a mechanical link between a drive 190 and a PCIe root port 134. For instance, a physical PCIe port 192 may be communicatively coupled to a PCIe root port 134. As an example, a PCIe cable may be coupled to a physical PCIe port 192. For instance, a drive 190 may be coupled to a PCIe cable, which may be coupled to a physical PCIe port 192.

Figure 2:
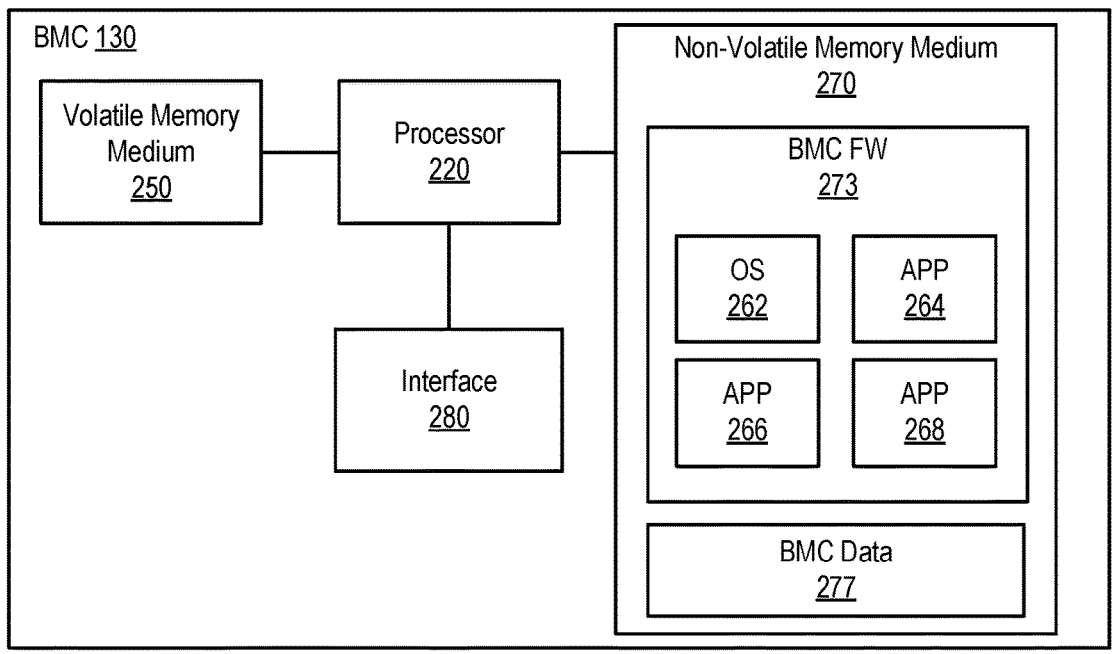
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3:
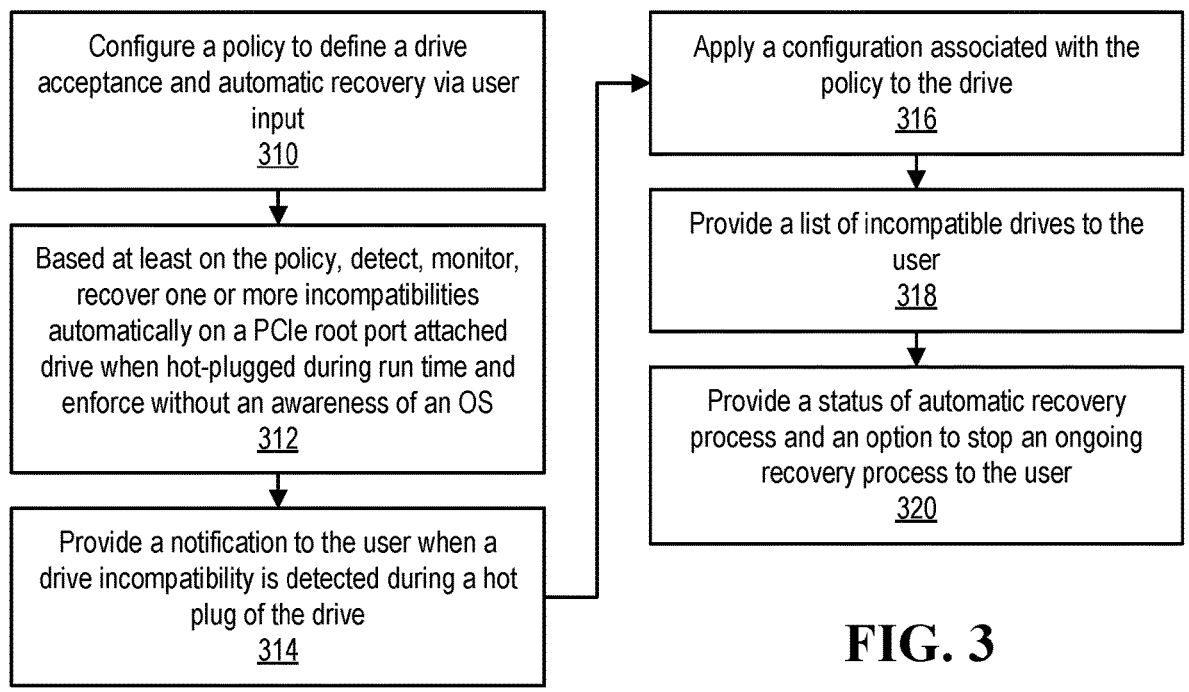
FIG. 3 illustrates an example of a method of operating an information handling system, according to one or more embodiments.

Turning now to FIG. 3, an example of a method of operating an information handling system is illustrated, according to one or more embodiments. At 310, a policy to define a drive acceptance and automatic recovery may be configured via user input. For example, BMC 130 may configure a policy to define a drive acceptance and automatic recovery via user input. For instance, BMC 130 may receive user input that defines a policy to define a drive acceptance and automatic recovery.

At 312, based at least on the policy, one or more incompatibilities may be detected, monitored, and/or recovered and may be enforced automatically on a PCIe root port attached drive, when hot plugged during run time, without an awareness of an OS. For example, BMC 130, based at least on the policy, may detect, monitor, and/or recover one or more incompatibilities automatically on a drive 190 when hot-plugged during run time and may enforce without an awareness of OS 162. For instance, BMC 130, based at least on the policy, may detect, monitor, recover one or more incompatibilities automatically on a drive 190 when hot-plugged during run time and may enforce the policy on drive 190 without utilizing OS 162. As an example, BMC may enforce the policy on drive 190 via bus 136. For instance, bus 136 may be a sideband interface to drive 190, avoiding utilizing OS 162 to communicate with drive 190 and/or to interact with drive 190. In one or more embodiments, the one or more incompatibilities associated with drive 190 may include one or more criteria of the policy that do not match drive 190.

At 314, a notification may be provided to the user when a drive incompatibility is detected during a hot plug of the drive. For example, BMC 130 may provide a notification to the user when a drive incompatibility is detected during a hot plug of drive 190. In one or more embodiments, BMC 130 may generate an event notifying the user when the drive incompatibility is detected during the hot plug of drive 190.

At 316, a configuration associated with the policy may be applied to the drive. For example, BMC 130 may apply a configuration associated with the policy to drive 190. In one or more embodiments, BMC 130 may automatically apply the configuration associated with the policy to drive 190. For example, the policy may indicate that the configuration associated is to be automatically applied to drive 190. For instance, the policy may include one or more criteria that indicate that BMC 130 may automatically apply the configuration associated with the policy to drive 190. In one or more embodiments, BMC 130 may receive user confirmation before applying the configuration associated with the policy to drive 190. For example, the policy may indicate that user confirmation is needed before the configuration associated with the policy can be applied to drive 190. For instance, the policy may include one or more criteria that indicate that BMC 130 may need user confirmation before the configuration associated with the policy can be applied to drive 190.

At 318, a list of incompatible drives may be provided to the user. For example, BMC 130 may provide a list of incompatible drives to the user. For instance, BMC 130 may provide a list of incompatible drives to the user via one or more of a management information exchange, IHSFW 172, OS 162, and an application executing on IHS 110, among others. At 320, a status of an automatic recovery process and an option to stop an ongoing recovery process may be provided to the user. For example, BMC 130 may provide a status of automatic recovery process and an option to stop an ongoing recovery process to the user. For instance, BMC 130 may provide a status of automatic recovery process and an option to stop an ongoing recovery process to the user via one or more of the management information exchange, IHSFW 172, OS 162, and the application executing on IHS 110, among others.

In one or more embodiments, the policy may be configured with one or more attributes associated with a drive 190 that BMC 130 can determine. In one example, an attribute associated with a drive 190 may be a size of drive 190. For instance, a criterion of the policy may include a requirement that drive 190 is at least one terabyte in size. In a second example, an attribute associated with a drive 190 may include a namespace of drive 190. For instance, a criterion of the policy may include a requirement that drive 190 include two namespaces. As an example, the criterion of the policy may include a requirement that drive 190 include a first namespace with a first size (e.g., a first amount of storage) and a second namespace with a second size (e.g., a second amount of storage). As another example, the criterion of the policy may include a requirement that drive 190 include a first namespace with 512 byte sectors and a second namespace with 4096 byte sectors. For instance, an application may expect drive 190 include a first namespace with 512 byte sectors and a second namespace with 4096 byte sectors.

In one or more embodiments, some of the one or more criteria may be satisfied or all of the one or more criteria must be satisfied. In one or more embodiments, BMC 130 may configure drive 190 based at least one the one or more criteria of the policy. In one example, BMC 130 may configure drive 190 with a first namespace with a first size (e.g., a first amount of storage) and a second namespace with a second size (e.g., a second amount of storage). For instance, BMC 130 may configure drive 190 with a first namespace with a first size (e.g., a first amount of storage) and a second namespace with a second size (e.g., a second amount of storage) without utilizing OS 162. In a second example, BMC 130 may configure drive 190 with a first namespace with 512 byte sectors and a second namespace with 4096 byte sectors. For instance, BMC 130 may configure drive 190 with a first namespace with 512 byte sectors and a second namespace with 4096 byte sectors without utilizing OS 162.

Figure 4:
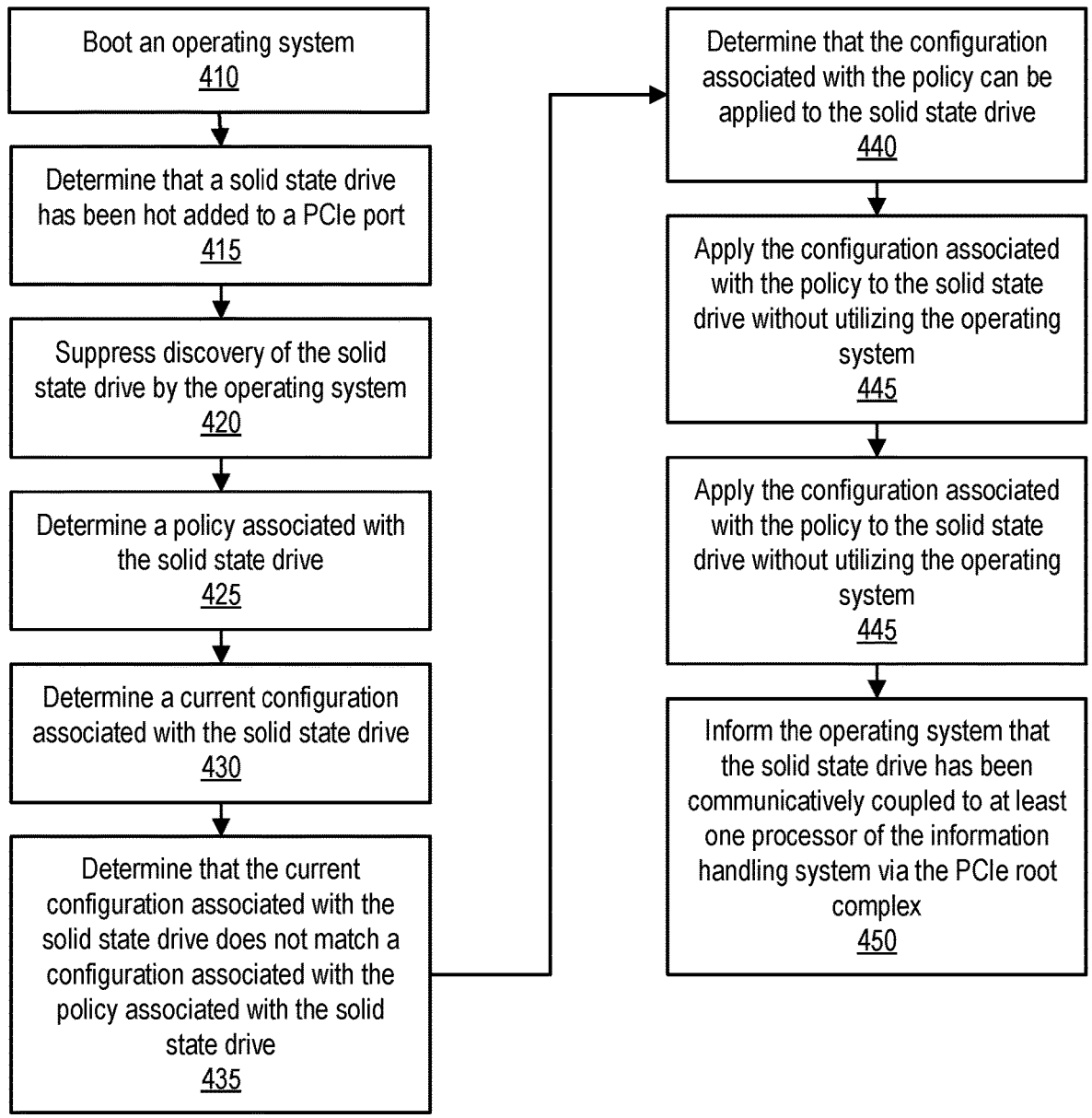
FIG. 4 illustrates another example of a method of operating an information handling system, according to one or more embodiments.

Turning now to FIG. 4, another example of a method of operating an information handling system is illustrated, according to one or more embodiments. At 410, an operating system may be booted. For example, IHS 110 may boot OS 162. For instance, processor 120 may boot OS 162. At 415, it may be determine that a solid state drive has been hot added to a PCIe port. In one example, IHS 110 may determine that a drive 190 has been hot added to a PCIe port 134. For instance, IHSFW 172 may determine that drive 190 has been hot added to PCIe port 134. In a second example, BMC 130 may determine that drive 190 has been hot added to PCIe port 134. In a third example, IHS 110 may determine that a drive 190 has been hot added to a PCIe port 192. For instance, IHSFW 172 may determine that drive 190 has been hot added to PCIe port 192. In another example, BMC 130 may determine that a drive 190 has been hot added to PCIe port 192. In one or more embodiments, determining that the solid state drive has been hot added to the PCIe port may be performed after booting the operating system. In one or more embodiments, the solid state drive may be compliant with a NVMe specification. For example, the solid state drive may be or may include a NVMe drive. In one or more embodiments, the solid state drive may include NAND flash memory. In one or more embodiments, determining that the solid state drive has been hot added to the PCIe port may include determining that the solid state drive has been hot plugged to the PCIe port.

At 420, discovery of the solid state drive by the operating system may be suppressed. For example, IHS 110 may suppress discovery of drive 190 by OS 162. For instance, IHSFW 172 may suppress discovery of drive 190 by OS 162. As an example, IHSFW 172 may not permit OS 162 to discover drive 190. At 425, a policy associated with the solid state drive may be determined. For example, BMC 130 may determine a policy associated with drive 190. In one or more embodiments, BMC 130 may store the policy associated with drive 190. For example, BMC 130 may store the policy associated with drive 190 via non-volatile memory medium 270.

At 430, a current configuration associated with the solid state drive may be determined. For example, BMC 130 may determine a current configuration associated with drive 190. For instance, BMC 130 may determine a current configuration associated with drive 190 via bus 136. In one or more embodiments, BMC 130 may be communicatively coupled to PCIe root complex 132. For example, BMC 130 may determine a current configuration associated with drive 190 via PCIe root complex 132. For instance, BMC 130 may communicate with drive 190 via PCIe root complex 132. In one or more embodiments, BMC 130 may communicate with drive 190 via a VDM transport.

At 435, it may be determined that the current configuration associated with the solid state drive does not match a configuration associated with the policy associated with the solid state drive. For example, BMC 130 may determine that the current configuration associated with drive 190 does not match a configuration associated with the policy associated with drive 190. In one or more embodiments, the policy associated with the solid state drive may include the configuration associated with the policy.

At 440, it may be determined that the configuration associated with the policy can be applied to the solid state drive. For example, BMC 130 may determine that the configuration associated with the policy can be applied to drive 190. In one or more embodiments, determining that the configuration associated with the policy can be applied to the solid state drive may be performed in response to determining that the current configuration does not match the configuration associated with the policy.

At 445, the configuration associated with the policy may be applied to the solid state drive without utilizing the operating system. For example, BMC 130 may apply the configuration associated with the policy to drive 190 without utilizing OS 162. In one instance, BMC 130 may apply the configuration associated with the policy to drive 190, via bus 136, without utilizing OS 162. In another instance, BMC 130 may apply the configuration associated with the policy to drive 190, via PCIe root complex 132, without utilizing OS 162.

At 450, the operating system may be informed that the solid state drive has been communicatively coupled to at least one processor of the information handling system via the PCIe root complex. In one example, IHS 110 may inform OS 162 that drive 190 has been communicatively coupled to processor 120 via PCIe root complex 132. For instance, IHSFW 172 may inform OS 162 that drive 190 has been communicatively coupled to processor 120 via PCIe root complex 132. In another example, BMC 103 may inform OS 162 that drive 190 has been communicatively coupled to processor 120 via PCIe root complex 132.

Figure 5:
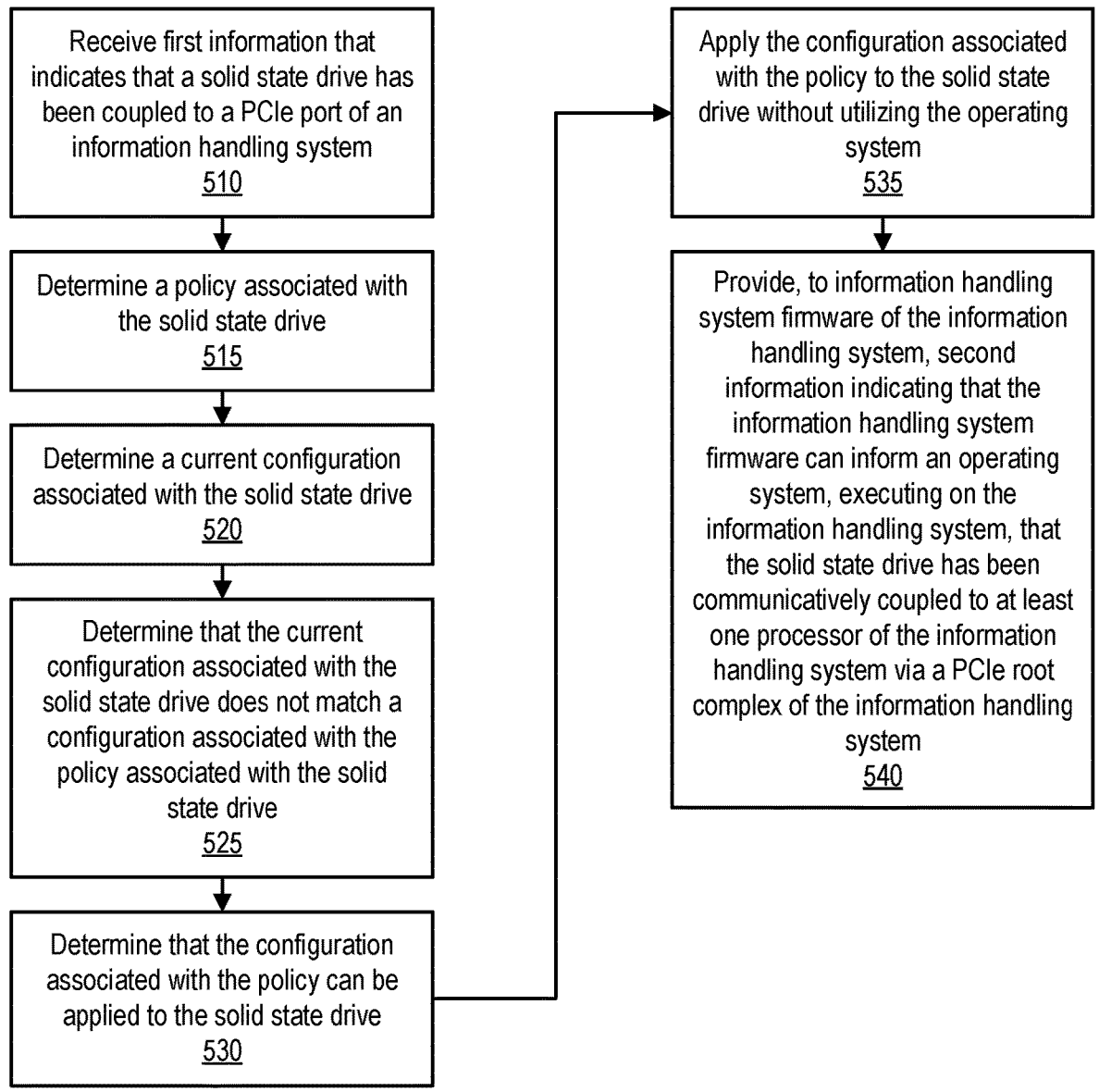
FIG. 5 illustrates an example of a method of operating a baseboard management controller, according to one or more embodiments.

Turning now to FIG. 5, an example of a method of operating a baseboard management controller is illustrated, according to one or more embodiments. At 510, first information that indicates that a solid state drive has been coupled to a PCIe port of an information handling system may be received. In one example, BMC 130 may receive first information that indicates that a drive 190 has been coupled to a port 134 of IHS 110. In another example, BMC 130 may receive first information that indicates that a drive 190 has been coupled to a port 192 of IHS 110. In one or more embodiments, IHSFW 172 may provide the first information to BMC 130.

At 515, a policy associated with the solid state drive may be determined. For example, BMC 130 may determine a policy associated with drive 190. In one or more embodiments, BMC 130 may store the policy associated with drive 190. For example, BMC 130 may store the policy associated with drive 190 via non-volatile memory medium 270. In one or more embodiments, determining the policy associated with the solid state drive may include retrieving the policy associated with the solid state drive from a memory medium. For example, BMC 130 may retrieve the policy associated with drive 190 from non-volatile memory medium 270.

At 520, a current configuration associated with the solid state drive may be determined. For example, BMC 130 may determine a current configuration associated with drive 190. For instance, BMC 130 may determine a current configuration associated with drive 190 via bus 136. In one or more embodiments, BMC 130 may be communicatively coupled to PCIe root complex 132. For example, BMC 130 may determine a current configuration associated with drive 190 via PCIe root complex 132.

At 525, it may be determined that the current configuration associated with the solid state drive does not match a configuration associated with the policy associated with the solid state drive. For example, BMC 130 may determine that the current configuration associated with drive 190 does not match a configuration associated with the policy associated with drive 190.

At 530, it may be determined that the configuration associated with the policy can be applied to the solid state drive. For example, BMC 130 may determine that the configuration associated with the policy can be applied to drive 190. In one or more embodiments, determining that the configuration associated with the policy can be applied to the solid state drive may be performed in response to determining that the current configuration does not match the configuration associated with the policy.

At 535, the configuration associated with the policy may be applied to the solid state drive without utilizing the operating system. For example, BMC 130 may apply the configuration associated with the policy to drive 190 without utilizing OS 162. In one instance, BMC 130 may apply the configuration associated with the policy to drive 190, via bus 136, without utilizing OS 162. In another instance, BMC 130 may apply the configuration associated with the policy to drive 190, via PCIe root complex 132, without utilizing OS 162.

At 540, second information indicating that information handling system firmware can inform an operating system, executing on the information handling system, that the solid state drive has been communicatively coupled to at least one processor of the information handling system via a PCIe root complex of the information handling system may be provided to the information handling system firmware. For example, BMC 130 may provide, to ISHFW 172, second information indicating that IHSFW 172 can inform OS 162, executing on IHS 110, that drive 190 has been communicatively coupled to processor 130 via PCIe root complex 132.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a Peripheral Component Interconnect Express (PCIe) root complex coupled to the at least one processor;
   a PCIe port coupled to the PCIe root complex;
   a baseboard management controller coupled to the at least one processor; and
   a memory medium, coupled to the at least one processor, that stores instructions executable by the at least one processor, which when executed by the at least one processor, cause the information handling system to:
   boot an operating system;
   after booting the operating system, determine that a solid state drive has been hot added to the PCIe port; and
   suppress discovery of the solid state drive by the operating system;
   wherein the baseboard management controller is configured to:
   determine a policy associated with the solid state drive;
   determine a current configuration associated with the solid state drive;
   determine that the current configuration associated with the solid state drive does not match a configuration associated with the policy associated with the solid state drive;
   in response to determining that the current configuration does not match the configuration associated with the policy, determine that the configuration associated with the policy can be applied to the solid state drive; and
   apply the configuration associated with the policy to the solid state drive without utilizing the operating system, including configuring the solid state drive i) with a first namespace and modifying a logical block address (LBA) size of the first namespace to a first size, and ii) with a second namespace and modifying a LBA size of the second namespace to a second size, wherein the second size differs from the first size; and
   wherein the instructions further cause the information handling system to:
   inform the operating system that the solid state drive has been communicatively coupled to the at least one processor via the PCIe root complex.

2. The information handling system of claim 1, further comprising:
   a bus;
   wherein the BMC and the solid state drive are coupled to the bus; and
   wherein, to determine the current configuration associated with the solid state drive, the baseboard management controller is further configured to communicate with the solid state drive via the bus.

3. The information handling system of claim 1,
   wherein the baseboard management controller is communicatively coupled the PCIe root complex; and
   wherein, to determine the current configuration associated with the solid state drive, the baseboard management controller is further configured to communicate with the solid state drive via the PCIe root complex.

4. The information handling system of claim 3, wherein, to communicate with the solid state drive via the PCIe root complex, the baseboard management controller is further configured to communicate with the solid state drive via a vendor defined message (VDM) transport.

5. The information handling system of claim 1,
wherein the solid state drive is communicatively coupled to the PCIe root complex via a PCIe link;
wherein the instructions further cause the information handling system to:
before suppressing discovery of the solid state drive by the operating system, bring up the PCIe link.

6. The information handling system of claim 1, wherein the baseboard management controller is further configured to, before applying the configuration associated with the policy to the solid state drive, receive user input indicating approval to apply the configuration associated with the policy to the solid state drive.

7. The information handling system of claim 1, wherein the baseboard management controller is further configured to, before applying the configuration associated with the policy to the solid state drive:
receive user input indicating a change to at least a portion of the configuration associated with the policy; and
change the configuration associated with the policy based at least on the user input indicating the change to the at least the portion of the configuration associated with the policy.

8. A method, comprising:
booting, by an information handling system, an operating system;
after the booting the operating system, determining, by information handling system firmware of the information handling system, that a solid state drive has been hot added to a Peripheral Component Interconnect Express (PCIe) port of the information handling system, which is coupled to a PCIe root complex of the information handling system;
suppressing, by the information handling system firmware, discovery of the solid state drive by the operating system;
determining, by a baseboard management controller of the information handling system, a policy associated with the solid state drive;
determining, by the baseboard management controller, a current configuration associated with the solid state drive;
determining, by the baseboard management controller, that the current configuration associated with the solid state drive does not match a configuration associated with the policy associated with the solid state drive;
in response to the determining that the current configuration does not match a configuration associated with the policy, determining, by the baseboard management controller, that the configuration associated with the policy can be applied to the solid state drive;
applying, by the baseboard management controller, the configuration associated with the policy to the solid state drive without utilizing the operating system, including configuring the solid state drive i) with a first namespace and modifying a logical block address (LBA) size of the first namespace to a first size, and ii) with a second namespace and modifying a LBA size of the second namespace to a second size, wherein the second size differs from the first size; and
informing, by the information handling system firmware, the operating system that the solid state drive has been communicatively coupled to a processor of the information handling system via the PCIe root complex.

9. The method of claim 8, wherein the determining the current configuration associated with the solid state drive includes communicating with the solid state drive via a bus of the information handling system.

10. The method of claim 8,
wherein the baseboard management controller is communicatively coupled the PCIe root complex; and
wherein the determining the current configuration associated with the solid state drive includes communicating with the solid state drive via the PCIe root complex.

11. The method of claim 10, wherein the communicating with the solid state drive via the PCIe root complex includes communicating with the solid state drive via a vendor defined message (VDM) transport.

12. The method of claim 8, wherein the solid state drive is communicatively coupled to the PCIe root complex via a PCIe link;
the method further comprising:
before the suppressing discovery of the solid state drive by the operating system, bringing up the PCIe link.

13. The method of claim 8, further comprising:
before the applying the configuration associated with the policy to the solid state drive, receiving user input indicating approval to apply the configuration associated with the policy to the solid state drive.

14. The method of claim 8, further comprising:
before the applying the configuration associated with the policy to the solid state drive:
receiving user input indicating a change to at least a portion of the configuration associated with the policy; and
changing the configuration associated with the policy based at least on the user input indicating the change to the at least the portion of the configuration associated with the policy.

15. A baseboard management controller, comprising:
a processor; and
a memory medium, coupled to the at least one processor, that stores instructions executable by the processor, which when executed by the processor, cause the baseboard management controller to:
receive first information that indicates that a solid state drive has been coupled to a Peripheral Component Interconnect Express (PCIe) port of an information handling system;
determine a policy associated with the solid state drive;
determine a current configuration associated with the solid state drive;
determine that the current configuration associated with the solid state drive does not match a configuration associated with the policy associated with the solid state drive;
in response to determining that the current configuration does not match the configuration associated with the policy, determine that the configuration associated with the policy can be applied to the solid state drive;
apply the configuration associated with the policy to the solid state drive without utilizing the operating system, including configuring the solid state drive i) with a first namespace and modifying a logical block address (LBA) size of the first namespace to a first size, and ii) with a second namespace and modifying a LBA size of the second namespace to a second size, wherein the second size differs from the first size; and provide, to information handling system firmware of the information handling system, second information indicating that the information handling system firmware can inform an operating system, executing on the information handling system, that the solid state drive has been communicatively coupled to at least one processor of the information handling system via a PCIe root complex of the information handling system.

16. The baseboard management controller of claim 15, wherein, to determine the current configuration associated with the solid state drive, the instructions further cause the baseboard management controller to communicate with the solid state drive via a bus of the information handling system.

17. The baseboard management controller of claim 15, wherein the baseboard management controller is communicatively coupled the PCIe root complex; and
wherein, to determine the current configuration associated with the solid state drive, the instructions further cause the baseboard management controller to communicate with the solid state drive via the PCIe root complex.

18. The information handling system of claim 17, wherein, to communicate with the solid state drive via the PCIe root complex, the instructions further cause the baseboard management controller to communicate with the solid state drive via a vendor defined message (VDM) transport.

19. The information handling system of claim 1, wherein the instructions further cause the baseboard management controller to, before applying the configuration associated with the policy to the solid state drive, receive user input indicating approval to apply the configuration associated with the policy to the solid state drive.

20. The information handling system of claim 1, wherein the instructions further cause the baseboard management controller to, before applying the configuration associated with the policy to the solid state drive:
receive user input indicating a change to at least a portion of the configuration associated with the policy; and
change the configuration associated with the policy based at least on the user input indicating the change to the at least the portion of the configuration associated with the policy.

* * * * *